Oct. 11, 1966

T. E. LEWIS ETAL 3,278,880

STRIP CONDUCTOR COILS WITH TERMINALS

Filed May 27, 1963

INVENTORS
THOMAS E. LEWIS
ROBERT B. LIGHTNER
BY
*Glenn, Palmer*
*& Matthews*
THEIR ATTORNEYS Oct. 11, 1966    T. E. LEWIS ETAL    3,278,880
STRIP CONDUCTOR COILS WITH TERMINALS
Filed May 27, 1963    3 Sheets-Sheet 2
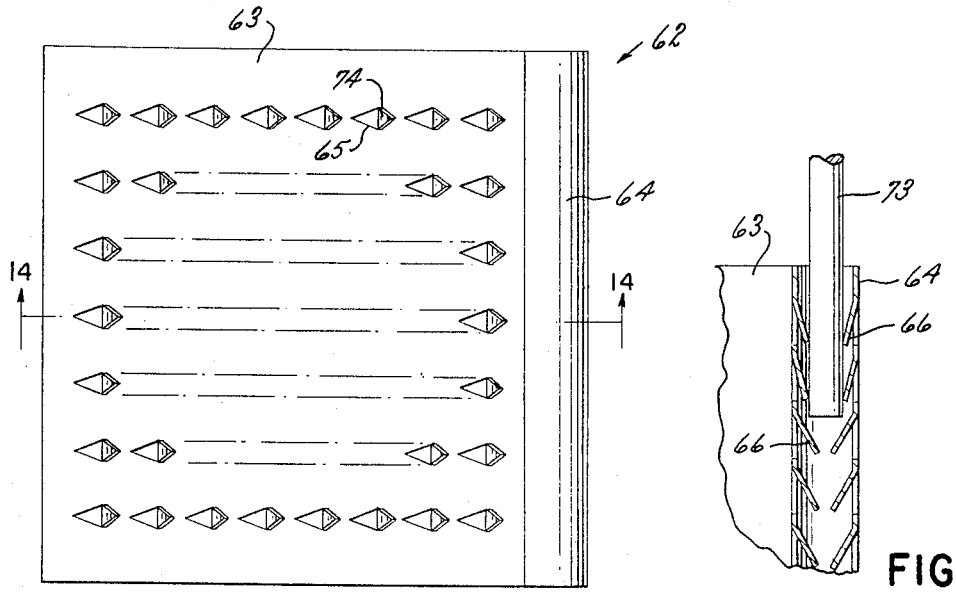
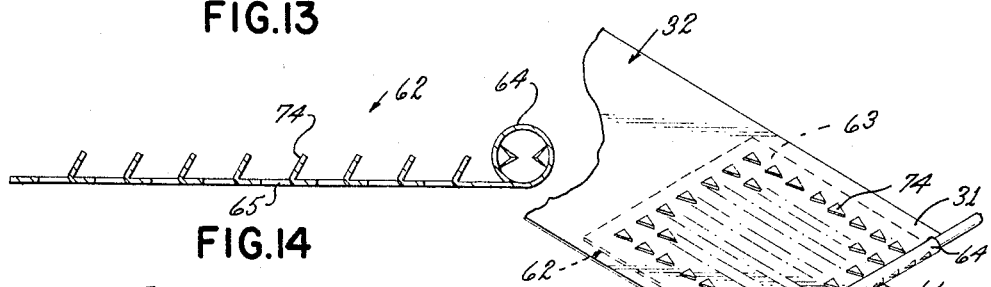
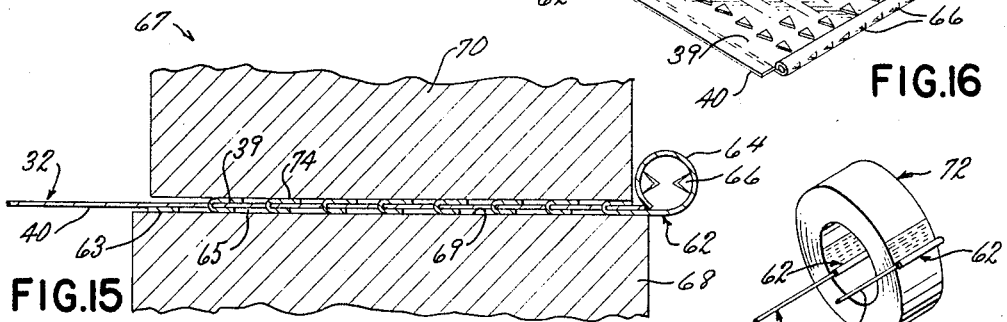
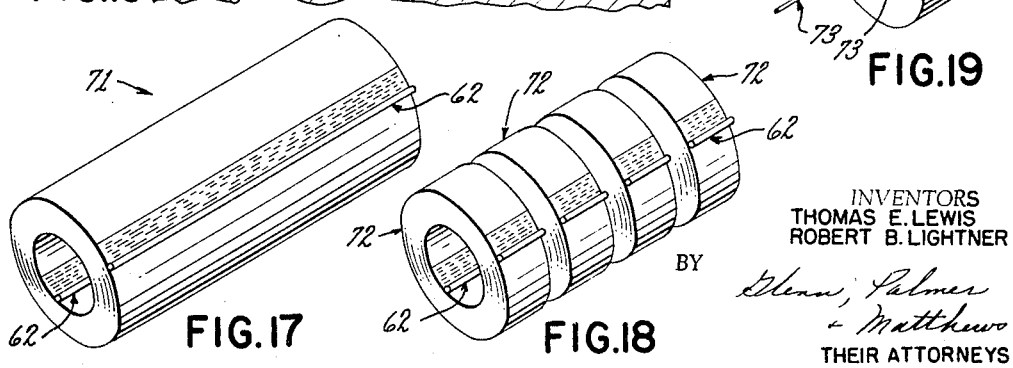
INVENTORS
THOMAS E. LEWIS
ROBERT B. LIGHTNER
BY
Glenn, Palmer
& Matthews
THEIR ATTORNEYS Oct. 11, 1966

T. E. LEWIS ETAL 3,278,880

STRIP CONDUCTOR COILS WITH TERMINALS

Filed May 27, 1963

INVENTORS
THOMAS E. LEWIS
ROBERT B. LIGHTNER

BY

Glenn, Palmer
& Matthews

THEIR ATTORNEYS

United States Patent Office 3,278,880
Patented Oct. 11, 1966

3,278,880
STRIP CONDUCTOR COILS WITH TERMINALS
Thomas E. Lewis, Chesterfield County, and Robert B. Lightner, Henrico County, Va., assignors to Reynolds Metals Company, Richmond, Va., a corporation of Delaware
Filed May 27, 1963, Ser. No. 283,267
12 Claims. (Cl. 336—192)

This invention relates to improved strip conductor coils or the like as well as to improved methods and apparatus for making such strip conductor coils or the like.

It is well known that strip conductors are normally formed by coiling a strip of conductive material, such as aluminum foil or the like, together with an insulating material so that each coil of the strip of conductive material would be insulated from its adjacent coil by this strip of insulating material.

Thereafter, leads are effectively attached to the inner and outer coils of the strip of conductive material in any suitable manner to complete the strip conductor.

Alternately, the strip conductor coil manufacturers first secured the leads to the ends of the strip of conductive material and, thereafter, wound the strip of conductive material whereby the interconnected leads provided many problems in effecting such a winding operation.

According to the teachings of this invention, however, an improved method and structure are provided wherein lead connectors can be respectively interconnected to the opposed ends of the strip of conductive material in such a manner that the interconnected lead connectors will permit the strip of conductive material to be subsequently coiled in the above manner whereby the interconnected lead connectors do not interfere with the rapid and simple method of coiling the strip of conductive material together with the strip of insulating material.

Further, the lead connectors of this invention are so constructed and arranged, that the same readily permit lead means to be interconnected thereto after the strip of conductive material has been coiled without requiring special tools or apparatus and without requiring the leads to be interconnected thereto before the strip of conductive material is coiled in the above manner.

Since the lead connectors do not project beyond the edges of the coil, the strip of conductive material can be slit to narrow widths and recoiled on one shaft without leads on adjacent coils interfering with each other whereby such method forms one of the principal features of this invention.

In one embodiment of this invention, the lead connector has a plurality of outwardly directed tang means adapted to pierce through the strip of conductive material and be folded against one side of the strip of conductive material to hold the other side thereof against a surface of the lead connector whereby the lead connector is effectively and simply interconnected to the strip of conductive material.

Each lead connector of this invention has a substantially tubular portion adapted to readily and effectively receive lead means to electrically interconnect a lead wire or the like to the strip of conductive material when required without requiring special tools or the like.

Accordingly, it is an object of this invention to provide an improved strip conductor coil having one or more of the novel features of this invention as set forth above hereinafter shown or described.

Another object of this invention is to provide an improved method for making such a strip conductor coil or the like.

Other objects, uses and advantages of this invention are apparent from a reading of this description which proceeds with reference to the accompanying drawings forming a part thereof and wherein:

FIGURE 1 is a fragmentary, perspective view illustrating one embodiment of the lead connector of this invention before the same is attached to one end of a strip of conductive material or the like.

FIGURE 13 is a top view of another lead connector of this invention.

FIGURE 14 is a cross-sectional view taken on line 14—14 of FIGURE 13.

FIGURE 15 is a cross-sectional view illustrating one method of securing the lead connector of FIGURE 13 to a strip of conductive material.

FIGURE 16 is a fragmentary perspective view illustrating the lead connector of FIGURE 13 completely secured to a strip of conductive material or the like.

FIGURE 17 is a perspective view illustrating a coiled strip conductor having the lead connectors of FIGURE 13 secured thereto.

FIGURE 18 is a view similar to FIGURE 17 illustrating the coiled strip conductor of FIGURE 17 cut into a plurality of narrower coils.

FIGURE 19 illustrates one of the coils of FIGURE 18 having lead wires interconnected thereto.

FIGURE 20 is an enlarged, fragmentary cross-sectional view illustrating how the lead wires are interconnected to the lead conductors of FIGURE 13.

Figure 1:
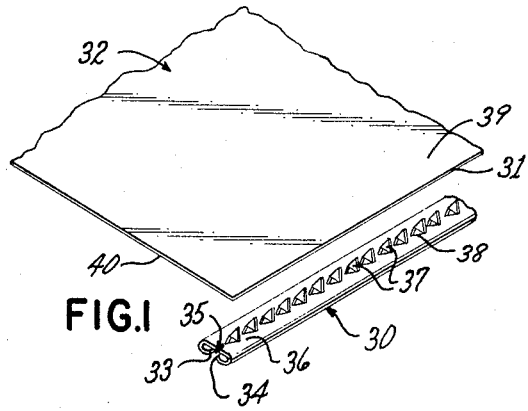

While the various features of this invention are hereinafter described and illustrated as being particularly adaptable for providing a strip conductor or the like, it is to be understood that the various features of this invention can be utilized singly or in any combination thereof to provide other devices as desired.

Therefore, this invention is not to be limited to only the embodiments illustrated in the drawings, because the drawings are merely utilized to illustrate one of the wide variety of uses of this invention.

Referring now to FIGURE 1, an improved lead connector of this invention is generally indicated by the reference numeral 30 and is adapted to be interconnected to an end 31 of a strip of conductive material 32, such as a strip of aluminum-containing metallic foil or the like.

The lead connector 30 can be formed of metallic conductive material and the like and is formed in substantially tubular form by having the opposed end edges 33 and 34 thereof looped toward each other and spaced from each other a desired distance to define a longitudinal slot 35 in one side of the tubular lead connector 30.

The other side 36 of the tubular lead connector 30 is substantially flat and has a plurality of outwardly directed tang means 37 for a purpose hereinafter described.

For example, each tang means 37 can comprise a substantially triangular portion having the base thereof hingedly interconnected to the side 36 of the lead connector 30 and is formed by carving the same from the side 36 of the lead connector 30 by suitable punching or stamping apparatus.

Figure 4:
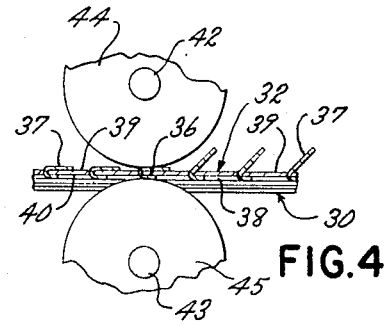
FIGURE 4 is an enlarged, fragmentary cross-sectional view taken on line 4—4 of FIGURE 3.

It is preferred that each tang means 37 be angled away from the respective opening 38 formed in the side 36 of the lead conductor 30 in the manner illustrated by the right-hand portion of FIGURE 4, each opening 38 being the result of a tang means 37 being stamped from the side 36 of the lead connector 30 in any suitable manner.

After the lead connector 30 has been formed in the above manner, the same is adapted to be readily attached to the end 31 of the sheet of conductive material 32 in a manner now to be described.

Figure 2:
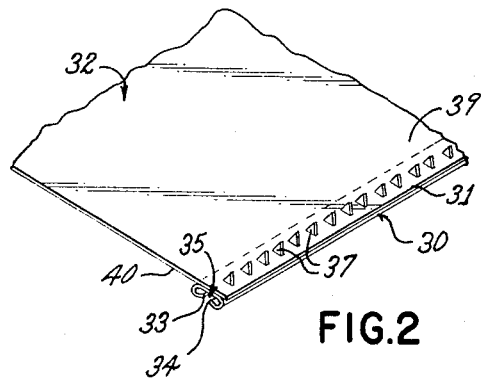
FIGURE 2 is a view similar to FIGURE 1 and illustrates one of the steps in the method of this invention for securing the lead connector to the strip of conductive material.

In particular, relative movement is created between the lead connector 30 and the sheet of conductive material 32 whereby the tang means 37 of the lead connector 30 pierce through the sheet of conductive material 32 as illustrated in FIGURE 2. Thereafter, each tang means 37 is folded against the side 39 of the sheet of conductive material 32 in the manner illustrated in FIGURE 3 to cause the other side 40 of the sheet of conductive material 32 to be tightly held against the side 36 of the lead connector 30 whereby the lead connector 30 is firmly secured to the sheet of conductive material 32.

It is preferred that the tang means 37 be so folded against the side 30 of the sheet of conductive material 32 that the same compact the side 40 of the sheet of conductive material 32 against the side 36 of the lead conductor 30 at points spaced from the respective openings 38 of the particular tang means 37 in the manner illustrated in FIGURE 4.

Figure 3:
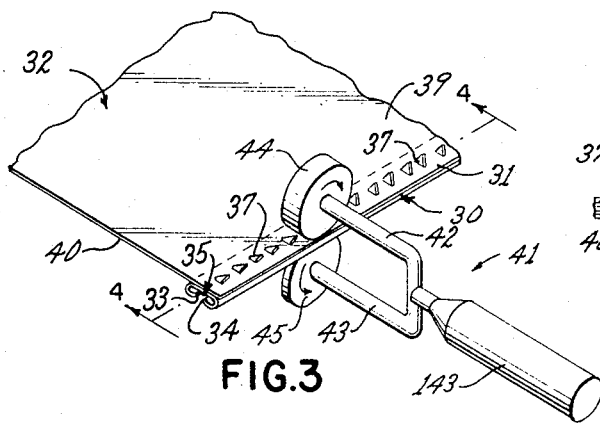
FIGURE 3 is a view similar to FIGURE 2 and illustrates another step in the method of securing the lead connector of this invention to the strip of conductive material.

While the lead connector 30 can be secured to the sheet of conductive material 32 in any suitable manner and by any suitable apparatus, one such apparatus is generally indicated by the reference numeral 41 in FIGURE 3 and comprises a hand tool having a pair of shafts or rods 42 and 43 disposed in spaced parallel relation and attached to handle 143, each rod 42 and 43 rotatably carrying a roller 44 and 45 adapted to rotate relative to the rods 42 and 43 and define a nip therebetween.

If desired, the roller 45 can be of a width to permit the same to be fully received in the slot 35 of the lead connector 30 in the manner illustrated in FIGURE 4 while the width of the roller 44 can be wider than widest portions of the tang means 37.

Thus, by inserting one end of a lead connector 30 and its interconnected strip of material 32 in the nip of rolls 45 and 44, the rolls 44 and 45 can be rolled relative to the lead connector 30 and strip of material 32 in the manner illustrated in FIGURES 3 and 4 to fold the tang means 37 downwardly against the surface 39 of the strip of conductive material 32 to fasten the lead connector to the strip of conductive material 32 in the manner previously described.

Therefore, it can be seen that the lead connector 30 can be simply and effectively secured to the strip of conductive material 32 when desired.

When forming coiled strip conductors, the manufacturer can attach an elongated length of the lead connector 30 to the leading edge of a strip of conductive material in the manner previously set forth and the leading edge of the strip of conductive material, together with its interconnected lead connector 30, can be coiled on a suitable reel or the like along with a strip of insulating material so that each coil of the strip of conductive material 32 will be separated from its adjacent coils of conductive material by the insulating material in a manner well known in the art.

Figure 5:
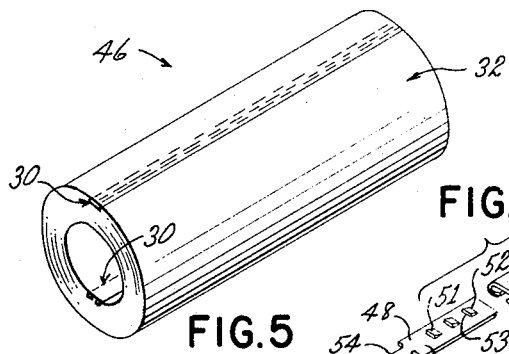
FIGURE 5 is a perspective view illustrating the completed strip conductor of this invention.

After a sufficient quantity of conductive material has been coiled in the above manner, the same can be severed from its supply roll of conductive material whereby another lead connector 30 can be secured to the trailing edge of the conductive material so that an elongated coil of conductive material will be provided in the manner illustrated in FIGURE 5 and generally indicated by the reference numeral 46.

As illustrated in FIGURE 5, the coil 46 of conductive material has a lead connector 30 at the inner coil thereof and a lead connector 30 at the outer coil thereof whereby the coil 46 can be formed without requiring leads to be connected thereto as in the past.

Further, the coil 46 can be formed on a core, if desired, because the lead connector 30 would not interfere with such a winding operation.

While one method of forming the coil 46 has been described above, it is to be understood that the lead connectors 30 could be connected to the opposed ends of a strip of conductive material 32 and, thereafter, the strip of conductive material 32 could be coiled in the manner previously described to provide the coil 46, if desired.

Figure 6:
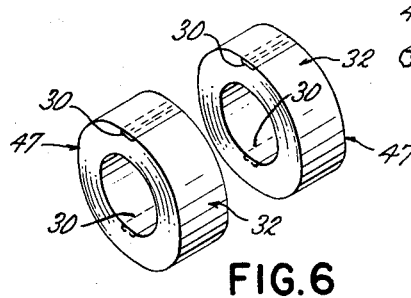
FIGURE 6 is a view similar to FIGURE 5 and illustrates the strip conductor of FIGURE 5 cut into a plurality of narrower strip conductors.

After the coil 46 has been formed in the above manner, the same can be cut into a plurality of narrower coils, if desired, by merely transversely severing the coil 46 into a plurality of smaller coils 47 in the manner illustrated in FIGURE 6 whereby each smaller coil 46 will still have a lead connector 30 at the inner coil thereof and a lead connector 30 at the outer coil thereof.

It may be found that when such smaller coils 47 are cut from the coil 46, it may be necessary to etch the severed surfaces thereof to prevent the ragged edges of the cut coils of conductive material from shorting across adjacent coils of the conductive material.

Thus, it can be seen that the coils 47 can be shipped and stored in the form illustrated in FIGURE 6 whereby packaging and handling thereof is relatively simple because leads are not connected thereto whereby the leads can be connected in the field or at the desired location when required without utilizing special tools or apparatus in a manner now to be described.

Figure 9:
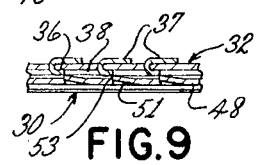
FIGURE 9 is an enlarged, fragmentary cross-sectional view illustrating how the lead member of FIGURE 7 is inserted in the lead connector of this invention.
Figures 7, 8, 12:
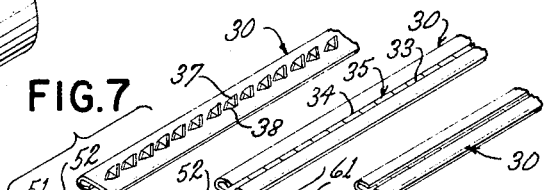
FIGURE 7 is a perspective view illustrating the lead connector of this invention and a lead member adapted to be inserted therein.
FIGURE 8 is a view similar to FIGURE 7 and illustrates the other sides of the parts of FIGURE 7.
FIGURE 12 is a view similar to FIGURE 7 and illustrates another embodiment of this invention.

In particular, one means for interconnecting lead means to the connector means 30 at the inner and outer ends of the coil of conductive material 32 is illustrated in FIGURES 7–9 wherein a lead member 48 of this invention is adapted to be interconnected to a lead wire 49 and be inserted in the tubular lead conductor 30 in a manner hereinafter described to electrically interconnect the lead 49 to the strip of conductive material 32.

The lead member 48 of this invention has a substantially flat rectangular portion 50 provided with outwardly directed tang means 51 carved therefrom and hingedly connected thereto at the lines 52, the tang means 51 each being substantially rectangular and having a leading edge 53 wider than the widest part of the openings 38 in the lead connector 30 for a purpose hereinafter described.

The lead 49 is adapted to be interconnected to one end of the lead member 48 in any suitable manner.

For example, the lead member 48 can have a clip portion 54 adapted to telescopically receive the bared end 55 of the lead wire 49 and be secured thereto by suitably crimping the clip portion 54 against the end 55 of the lead wire 49.

Alternately or additionally, the ends 55 of the lead wire 49 could be soldered or fastened to the end of the lead member 48 in any other suitable manner.

The other end of the lead member 48 is beveled at 56 to facilitate insertion of the same in the tubular lead connector 30 in the manner illustrated in FIGURE 9.

When the lead 48 is telescoped into the lead connector 30, the same is substantially press-fitted therein by the free ends 53 of the tangs 51 of the lead member 48 compressing against the under surface of the side 36 of the lead connector 30 whereby good electrical contact is provided between the lead member 48 and the lead connector 30.

Further, since the tangs 51 of the lead member 48 are cammed downwardly as the lead member 48 is telescoped into the lead connector 30, the free ends 53 of the tangs 51 tend to dig into the under surface of the side 36 of the lead connector 30 when an attempt is made to remove the lead member 48 whereby it can be seen that the lead member 48 cooperates with the lead connector 30 in a manner to fully secure the lead wire 49 thereto as well as to electrically interconnect the lead wire 49 to the strip of conductive material 32.

Therefore, it can be seen that lead wires can be respectively interconnected to the inner and outer lead connectors 30 of each coil 47 in a simple and effective manner at any desired time and place as special tools are not required and the coils 47 can be formed without the leads 49 already being interconnected thereto.

If desired, the tang means 51 of the lead member 48 can be so constructed and arranged that the same will interlock in the openings 38 of the lead connector 30, if desired.

Figures 10, 11:
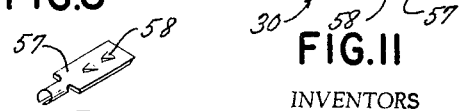
FIGURE 10 is a perspective view of another lead member of this invention.
FIGURE 11 is a view similar to FIGURE 9 and illustrates the lead member of FIGURE 10 inserted in the lead connector of this invention.

For example, reference is made to FIGURE 10 wherein another lead member of this invention is provided and is indicated by the reference numeral 57, the lead member 57 having a plurality of outwardly directed tang means 58 carved therefrom and being substantially triangular in the same manner as the tang means 37 previously described.

As illustrated in FIGURE 11, when the lead member 57 is inserted in the tubular lead connector 30, the tang means 58 are cammed downwardly by the under surface of the side 36 of the lead connector 30 to facilitate such insertion.

However, when an attempt is made to remove the lead member 57 from the lead connector 30, the tangs 58 spring upwardly into the openings 38 of the lead connector 30 to fully fasten the lead member 57 thereto.

If desired, the lead members 48 and 57 previously described can be provided with longitudinal ribs on the sides thereof opposed to the tang means 51 and 58 thereof to cause further press-fitting of the respective lead member in the tubular lead connector 30.

For example, another lead member of this invention is indicated by the reference numeral 59 in FIGURE 12 and has a plurality of tang means 60 carved therefrom in the manner similar to the tang means 51 previously described.

However, the other side of the lead member 59 has a pair of longitudinal rib means 61 at the outer edges thereof which are adapted to be press-fittingly received in the tubular lead connector 30 to further secure the lead member 59 thereto.

Accordingly, it can be seen that the lead connectors 30 of this invention are adapted to readily receive various types of lead members to electrically interconnect a lead wire to the strip of conductive material 32 in a simple and effective manner without requiring special apparatus or tools as in the past.

Another lead connector of this invention is generally indicated by the reference numeral 62 in FIGURES 13 and 14 and is formed of conductive metallic material in any suitable manner whereby the same has a substantially flat and rectangular plate-like portion 63 provided with a tubular portion 64 at one end thereof, the tubular portion 64 merely being formed by coiling one end of the blank of material forming the lead connector 62.

The plate-like portion 63 of the lead connector 62 has a plurality of outwardly directed tang means 74 carved therefrom in the manner previously described, the tang means 74 being substantially triangular and having the bases thereof hingedly connected to the plate-like portion 63 whereby each tang means 74 results in an opening 65 in the plate-like portion 63 in the manner previously described.

Preferably, the tang means 74 extend at an angle relative to the plate-like portion 63 in the manner illustrated in FIGURE 14 so as to be angled away from their respective openings 65 for a purpose hereinafter described.

The tubular portion 64 of the lead connector 62 also has a plurality of inwardly directed tang means 66 formed inwardly therein by being carved from the tubular portion 64 in any suitable manner to facilitate securement of lead means therein in a manner hereinafter described.

After the lead connector 62 has been formed in the above manner, the same is adapted to be secured to one end 31 of a strip of conductive material 32 in any suitable manner by having the outwardly directed tang means 74 of the plate-like portion 63 of the lead connector 62 pierced through the strip of conductive material 32 in the manner previously described and folded against the side 39 thereof to hold the other side 40 thereof against the plate-like portion 63 of the connector 62 in the manner previously described.

For example, after the tang means 74 have been pierced through the strip of conductive material 32, the tang means 74 can be folded downwardly by a suitable die apparatus 67 illustrated in FIGURE 15.

As illustrated in FIGURE 15, the apparatus 67 includes a lower die member 68 which can receive the plate-like portion 63 of the lead connector 62 against an upper surface 69 thereof while an upper die member 70 can move downwardly to fold the tang means 74 against the side 39 of the strip of conductive material 32 to compact the other side 40 thereof against the plate-like portion 63 of the lead connector 62 to effectively secure the lead connector 62 to the strip of conductive material 32.

Thus, it can be seen that the lead connectors 62 can be secured to the opposed ends of the strip of conductive material 32 as the same is being coiled into a coil thereof or before, as desired.

In any event, the strip of conductive material 32 is adapted to be formed into an elongated coil 71 as illustrated in FIGURE 17 wherein the inner and outer coils thereof respectively have a lead connector 62 effectively secured thereto and each coil of conductive material 32 is separated from adjacent coils thereof by a strip of insulating material or the like in the manner previously described.

Thereafter, the elongated coil 71 can be cut into narrower coils 72 in the manner illustrated in FIGURE 18 to provide the coils 72 with the desired widths for the desired purposes thereof, the severed edges of the coils 72 being suitably etched to prevent shortening across the adjacent coils of the conductive material 32 in the manner previously described.

When it is desired to interconnect a lead means to the inner and outer lead connectors 62 of the coils 72, a bared lead wire 73 can be inserted into the tubular portion 64 of the respectively connector 62 in the manner illustrated in FIGURE 20 whereby it can be seen that as the lead wire 73 is pushed into the tubular portion 64, the lead wire 73 cams the tang means 66 thereof outwardly to permit such insertion. However, when an attempt is made to withdraw the lead wire 73 from the tubular portion 64 of the lead connector 62, it can be seen that the pointed ends of the tang means 66 dig into the lead wire 73 to tend to prevent removal thereof whereby the lead wire 73 is not only effectively secured to the lead connector 62, but also is electrically connected to the conductive material 32 by the connector 62.

While various methods of this invention have been previously set forth, one important feature of the lead connectors of this invention is that since the lead connectors for each strip conductor coil do not extend beyond the edges thereof, a relatively wide strip of conductive material can be slit into a plurality of narrow widths and recoiled on one shaft or the like without leads on adjacent narrow coils interfering with each other whereby the strip conductor coils of this invention can be substantially continuously made in a fast production and economical manner.

In particular, reference is made to FIGURES 21–24 wherein such a method and apparatus of this invention is generally indicated by the reference numeral 75 and comprises a supply roll 76 of a relatively wide strip of conductive material 77, a supply roll 78 of a relatively wide strip of insulating material 79, slitting apparatus 80 and 81 for the strips of material 77 and 79 and a coiling apparatus 82 for the strips of material 77 and 79.

Figure 21:
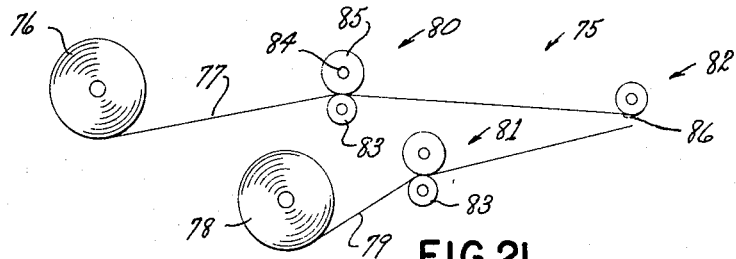
FIGURE 21 is schematic side view illustrating one method and apparatus of this invention.
Figure 22:
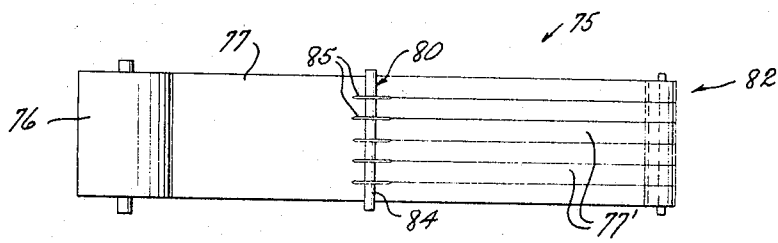
FIGURE 22 is a top view of the apparatus illustrated in FIGURE 21.

As illustrated in FIGURES 21 and 22, each slitting apparatus 80 and 81 comprises a backup roll 83 and a shaft 84 having a plurality of circular cutters or blades 85 mounted in spaced relation thereon and cooperating with the backup roll 83 to slit the strip of material 77 or 79 into a plurality of narrow strips as illustrated in FIGURE 22.

When it is desired to initially operate the apparatus 75 of this invention, the leading edge of the strip of material 77 is fed through the nip of the slitting apparatus 80 whereby the slitting apparatus 80 slits the strip of material 77 into a plurality of narrow strips 77' in the manner illustrated in FIGURE 22, the strip of material 77 being fed through the slitting apparatus 80 until the leading edge thereof is disposed adjacent the coiling apparatus 82 in the manner illustrated in FIGURE 21.

Thereafter, individual lead connectors of this invention are respectively interconnected to the leading edges of each of the narrow strips of material 77' in the manner indicated by the reference numeral 86, the lead connectors 86 either being the lead connectors 30 or 62 previously described.

Thereafter, the narrow strips of material 77' are attached to the coiling apparatus 82 so that upon rotation of the coiling apparatus 82, the narrow strips of material 77' will be coiled thereon while continuously drawing the wide strip of material 77 through the cutting apparatus 80.

While the strip of material 77 is being coiled on the apparatus 82 in the above manner, the strip of insulating material 79 is drawn through the cutting apparatus 81 to cut the same into narrow strips corresponding to the strips 77' of conductive material whereby the insulating material can be coiled along with the conductive material on the coiling apparatus 82 so that the insulating material will separate adjacent coils of conductive material on the coiling apparatus 82.

Figure 23:
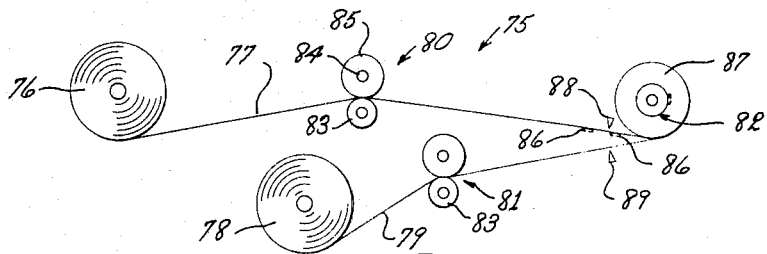
FIGURES 23 and 24 are views similar to FIGURE 21 and respectively illustrate the apparatus in different operating positions thereof.

Therefore, it can be seen that because the individual lead connectors 86 in FIGURES 21 and 22 do not extend beyond the opposed edges of each narrow strip 77', the same do not interfere with the coiling thereof on the coiling apparatus 82 whereby the resulting narrow coils 87 being formed on the coiling apparatus 82 in the manner illustrated in FIGURE 23 can be formed from a single wide strip of conductive material 77.

When the desired number of turns of the coiling apparatus 82 has been accomplished, the rotation thereof is stopped in the manner illustrated in FIGURE 23 whereby a plurality of individual lead connectors 86 can be attached to the narrow strips 77' of the conductive material in the proper location thereon so that the same will form the outer connectors of the individual coils 87.

At the same time, another row of lead connectors 86 are connected to the narrow strips 77' so as to the form the inside lead connectors of the next set of narrow coils to be formed on the coiling apparatus 82 in the above manner.

Figure 24:
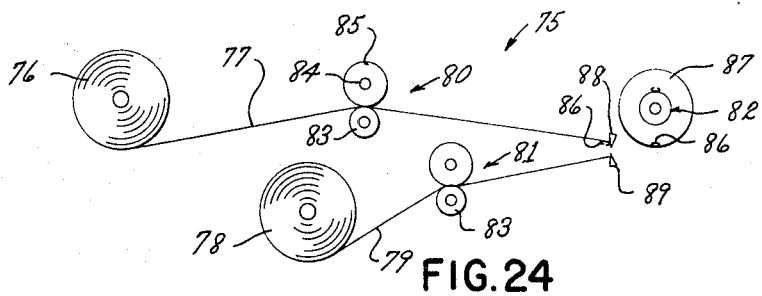

After the two sets of lead connectors 86 have been attached in the manner illustrated in FIGURE 23, suitable cutting apparatus 88 and 89 can be respectively utilized to cut the narrow strips 77' of conductive material and the narrow strips of insulating material so that the trailing portions thereof can be completely wound on the coiling apparatus 82 in the manner illustrated in FIGURE 24 to complete the first set of narrow conductive coils 87.

Thereafter, the completed strip conductor coils 87 are removed from the coiling apparatus 82 whereby the same can be stored, shipped and subsequently utilized by having lead wires interconnected thereto in any of the manners previously set forth.

When the first set of coils 87 has been moved from the coiling apparatus 82, an additional set of strip conductor coils can be formed on the coiling apparatus by interconnecting the now leading edges of the narrow strips 77' of conductive material and insulating material 79 to the coiling apparatus 82 in the manner illustrated in FIGURES 21 and 22 to form the next set of narrow strip conductor coils 87 on the coiling apparatus 82.

Therefore, it can be seen that the method and apparatus 75 of this invention provides a substantially continuous production operation for forming the strip conductor coils of this invention previously described.

Therefore, it can be seen that this invention provides improved strip conductors or the like as well as improved methods and apparatus for making a strip conductor or the like.

While the invention has been disclosed with respect to the attachment of connectors to strip conductor coils by the use of tangs, the methods are completely independent thereof and may be practiced by cold pressure welding, soldering, or brazing the connectors to the coils or any other means for obtaining a good mechanical and electrical connection.

While the form of the invention now preferred has been disclosed as required by the statutes, other forms may be used, all coming within the scope of the claims which follow.

What is claimed is:

1. In combination, a longitudinal strip of conductive material having a transverse end edge, and a lead connector having a plate-like portion provided with outwardly directed tang means, said tang means piercing through said strip of material and being folded against one side of said strip of material to hold the other side thereof against said plate-like portion of said lead connector, said lead connector having a tubular portion adjacent and parallel to said end edge of said strip of material and outboard of said end edge to receive a lead wire or the like in the opening of said tubular portion, said strip of conductive material being coiled upon itself with said lead connector and tubular portion extending completely and transversely across said coil whereby said coil and connector can be sliced into a plurality of coils each having its own lead connector with a tubular portion.

2. A combination as set forth in claim 1 wherein said tubular portion has inwardly directed tang means that are adapted to grip a lead wire inserted into said opening of said tubular portion to hold said lead wire in said opening in said tubular portion.

3. A combination as set forth in claim 2 wherein said tang means of said tubular portion are carved therefrom.

4. In combination, a strip of conductive material, and a lead connector defining a substantially tubular structure having tang means on one exterior side of said tubular structure and extending outwardly from said one exterior side of said tubular structure, said tang means piercing through said strip of material and being folded against one side of said strip of material to hold the other side thereof against said one exterior side of said tubular structure, said tubular structure being adapted to receive a lead means or the like.

5. A combination as set forth in claim 4 wherein said tubular structure comprises a strip of material having opposed end edges brought closely adjacent each other to define a longitudinal groove in the other exterior side of said tubular structure.

6. In combination, a strip of conductive material, a lead connector defining a substantially tubular structure having outwardly directed tang means on one side of said tubular structure, said tang means piercing through said strip of material and being folded against one side of said strip of material to hold the other side thereof against said one side of said tubular structure, a lead wire, and a lead member connected to said lead wire and inserted in said tubular structure to electrically connect said lead wire to said strip of material.

7. A combination as set forth in claim 6 wherein said lead member has outwardly directed tang means that cooperate with said tubular structure to tend to hold said lead member in said tubular structure.

8. A combination as set forth in claim 6 wherein said tubular structure has openings provided therein and wherein said lead member has outwardly directed tang means received in said openings to hold said lead member in said tubular structure.

9. A combination as set forth in claim 8 wherein said tang means of said tubular structure are integral with and bent outwardly from said one side of said tubular structure whereby the resulting areas from which said tang means are bent define said openings.

10. A combination as set forth in claim 6 wherein said lead member is press-fitted in said tubular structure.

11. A combination as set forth in claim 10 wherein said tubular structure is longitudinally split to provide resiliency thereof for press-fittingly receiving said lead member.

12. A combination as set forth in claim 6 wherein said lead member has a beveled end to facilitate insertion thereof in said tubular structure.

References Cited by the Examiner
UNITED STATES PATENTS

| | | | |
|---|---|---|---|
| 2,291,434 | 7/1942 | Hollopeter et al. | 174—90 |
| 2,604,508 | 7/1952 | Bergan | 174—84 |
| 2,623,101 | 12/1952 | Kurland et al. | 317—242 X |
| 2,869,052 | 1/1959 | Ness et al. | 317—260 |
| 3,025,339 | 3/1962 | Gordon et al. | 174—84 |
| 3,112,556 | 12/1963 | Zack | 29—155.57 |
| 3,113,374 | 12/1963 | Zack | 29—155.57 |
| 3,124,641 | 3/1964 | Anderson | 174—84.1 |
| 3,138,658 | 6/1964 | Weimer | 184—84 |
| 3,163,840 | 12/1964 | Zack | 174—94 X |

LARAMIE E. ASKIN, *Primary Examiner.*

JOHN P. WILDMAN, JOHN F. BURNS, *Examiners.*

D. L. CLAY, *Assistant Examiner.*